US010017006B1

(12) United States Patent
Salmons et al.

(10) Patent No.: US 10,017,006 B1
(45) Date of Patent: Jul. 10, 2018

(54) ROLLER KIT FOR POWER WASHER SURFACE CLEANER ATTACHMENT AND CORRESPONDING METHOD

(71) Applicant: Control Devices, LLC, Fenton, MO (US)

(72) Inventors: Steven Salmons, St. Louis, MO (US); James E. Norris, Jr., St. Louis, MO (US)

(73) Assignee: Control Devices, LLC, Fenton, MO (US)

( * ) Notice: Subject to any disclaimer, the term of this patent is extended or adjusted under 35 U.S.C. 154(b) by 0 days.

(21) Appl. No.: 15/612,755

(22) Filed: Jun. 2, 2017

(51) Int. Cl.
*B60B 33/00* (2006.01)
*A47L 11/40* (2006.01)
*A47L 11/283* (2006.01)

(52) U.S. Cl.
CPC ........ *B60B 33/0026* (2013.01); *A47L 11/283* (2013.01); *A47L 11/4038* (2013.01); *A47L 11/4072* (2013.01); *A47L 11/4088* (2013.01); *B60B 33/001* (2013.01); *B60B 33/0049* (2013.01); *B60B 33/0057* (2013.01); *B60B 33/0068* (2013.01); *Y10T 16/191* (2015.01)

(58) Field of Classification Search
CPC .............. B60B 33/0026; B60B 33/001; B60B 33/0049; B60B 33/0057; B60B 33/0068; B60B 33/0002; A47L 11/283; A47L 11/4038; A47L 11/4072; A47L 11/4088; Y10T 16/18; Y10T 16/19; Y10T 16/191
USPC .................. 16/29, 30, 18 R; D8/375; 15/49.1
See application file for complete search history.

(56) References Cited

U.S. PATENT DOCUMENTS

| | | | |
|---|---|---|---|
| 1,968,974 A | 8/1934 | Tracy et al. | |
| 2,478,563 A | 8/1949 | Book | |
| 2,749,564 A | 6/1956 | Tally | |
| 3,010,135 A | 11/1961 | Pollnow, Jr. | |
| 3,068,503 A | 12/1962 | Jepson et al. | |
| 3,091,158 A | 5/1963 | Bunger et al. | |
| 3,452,380 A * | 7/1969 | Walther | A47L 11/4072 15/49.1 |
| 3,715,722 A | 2/1973 | Downing et al. | |
| 3,748,050 A | 7/1973 | Poppitz | |
| 4,086,680 A | 5/1978 | Kelly | |
| 4,107,816 A | 8/1978 | Matthews | |

(Continued)

FOREIGN PATENT DOCUMENTS

DE  102008029648 A1  12/2009
WO  WO9721378 A1  6/1997

*Primary Examiner* — William Miller
(74) *Attorney, Agent, or Firm* — Senniger Powers LLP

(57) ABSTRACT

A roller kit for a power washer surface cleaner attachment. A roller mount includes a bracket mounting a roller for rotation with respect to the roller mount and a clip for securing the roller kit to the surface cleaner attachment such that the roller is operatively aligned with the surface cleaner attachment for rolling over a surface to guide movement of the surface cleaner attachment along said surface. The clip includes a base portion supporting the bracket and an arm portion opposing the base portion. The clip is configured to bend resiliently in an opening direction to define an opening between the arm portion and the base portion for receiving a side wall of the shroud and to rebound in a gripping direction to grip the side wall between the arm portion and the base portion and thereby secure the roller kit to the surface cleaner attachment.

18 Claims, 6 Drawing Sheets

(56) References Cited

U.S. PATENT DOCUMENTS

| | | | |
|---|---|---|---|
| 4,167,271 | A | 9/1979 | Jorgensen |
| 4,367,880 | A | 1/1983 | Harding |
| 4,600,149 | A | 7/1986 | Wakatsuki |
| 4,903,364 | A | 2/1990 | Long |
| 5,088,799 | A * | 2/1992 | Redmon ............ B60B 33/0002 16/30 |
| 5,426,817 | A * | 6/1995 | Rekuc ...................... A45C 5/14 16/29 |
| D363,209 | S * | 10/1995 | Murphy ......................... D8/375 |
| 5,727,284 | A * | 3/1998 | Deutsch ............... A47B 91/002 16/18 R |
| 5,940,932 | A * | 8/1999 | LaHay .................... B60B 33/06 16/30 |
| 5,991,968 | A | 11/1999 | Moll et al. |
| 6,012,645 | A | 1/2000 | Poppitz |
| 6,378,163 | B1 | 4/2002 | Moll et al. |
| 6,450,515 | B1 * | 9/2002 | Guth ................... B60B 33/0063 16/30 |
| 7,162,772 | B2 * | 1/2007 | Asher ................ B60B 33/0002 16/29 |
| 7,770,254 | B2 | 8/2010 | Alexander |
| 8,444,157 | B2 | 5/2013 | Pryor et al. |
| 8,667,644 | B1 | 3/2014 | Marion |
| 2007/0113368 | A1 | 5/2007 | Alexander |
| 2008/0034534 | A1 | 2/2008 | Zarbi et al. |
| 2010/0251513 | A1 | 10/2010 | Pryor et al. |
| 2013/0255027 | A1 | 10/2013 | Burns |

\* cited by examiner

ROLLER KIT FOR POWER WASHER SURFACE CLEANER ATTACHMENT AND CORRESPONDING METHOD

FIELD

This disclosure pertains generally to a roller kit for a power washer surface cleaner attachment and a method of using a roller kit with a power washer surface cleaner attachment.

BACKGROUND

Power washer surface cleaner attachments include a nozzle mounted inside a shroud for directing high pressure liquid jets toward a surface to be cleaned. In heavy duty or commercial units, the shroud is supported on rollers or casters for guiding the device along the surface to be cleaned. Some lighter duty units do not include rollers. Instead, the shroud directly contacts the ground. If the power washer provides adequate pressure, the liquid jets directed against the surface cause the shroud to continuously or intermittently hover over the surface during use.

SUMMARY

In one aspect, a roller kit for a power washer surface cleaner attachment comprises a roller configured for rotation about a roller axis. A roller mount includes a bracket mounting the roller for rotation about the roller axis with respect to the roller mount and a clip for securing the roller kit to the surface cleaner attachment such that the roller is operatively aligned with the surface cleaner attachment for rolling over a surface to guide movement of the surface cleaner attachment along said surface. The clip includes a base portion supporting the bracket and an arm portion opposing the base portion. The clip is configured to bend resiliently in an opening direction to define an opening between the arm portion and the base portion for receiving a side wall of the shroud and to rebound in a gripping direction to grip the side wall between the arm portion and the base portion and thereby secure the roller kit to the surface cleaner attachment.

In another aspect, a method of using a roller kit for a surface cleaner attachment for a power sprayer comprises bending a clip of a roller mount of the roller kit that supports a roller for rotation about a roller axis so that the clip defines an opening. A side wall of a shroud of the surface cleaner attachment is inserted into the opening. The clip is released after inserting the side wall into the opening so that the clip rebounds to grip the side wall and thereby releasably secures the roller kit to the shroud.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
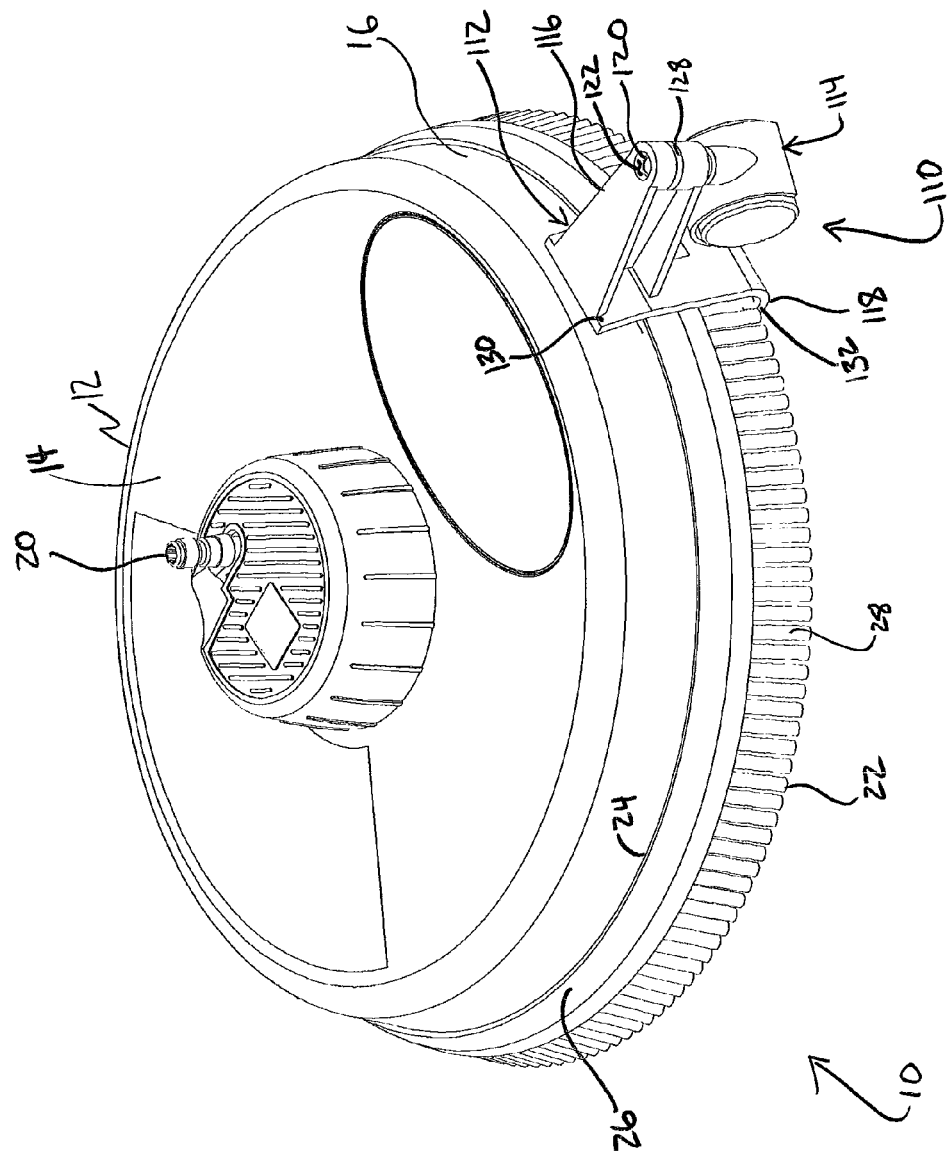
FIG. 1 is a perspective of a surface cleaner attachment for a power washer and a roller kit installed on the surface cleaner attachment.
Figure 2:
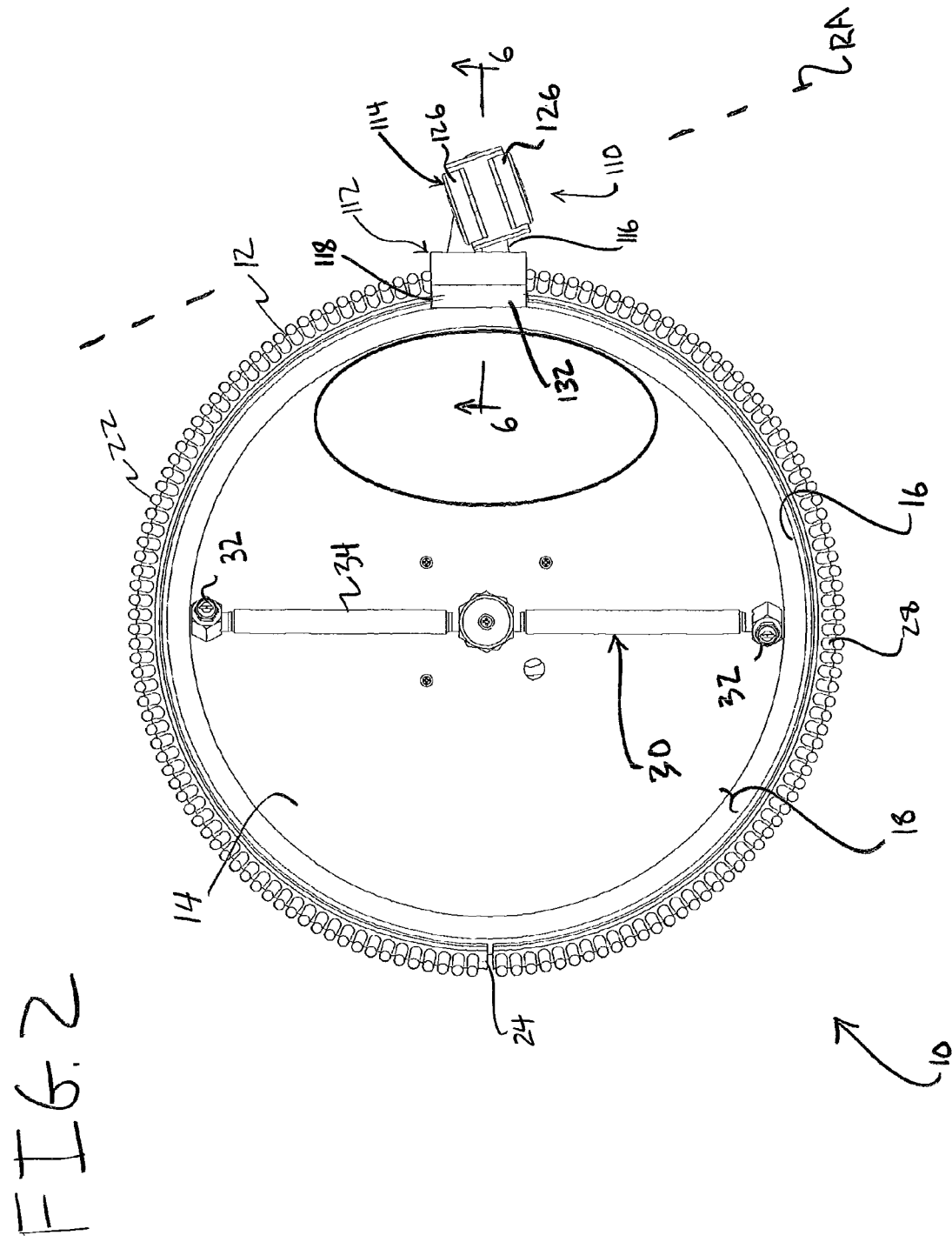
FIG. 2 is a bottom plan view of the surface cleaner attachment and the roller kit.
Figure 3:
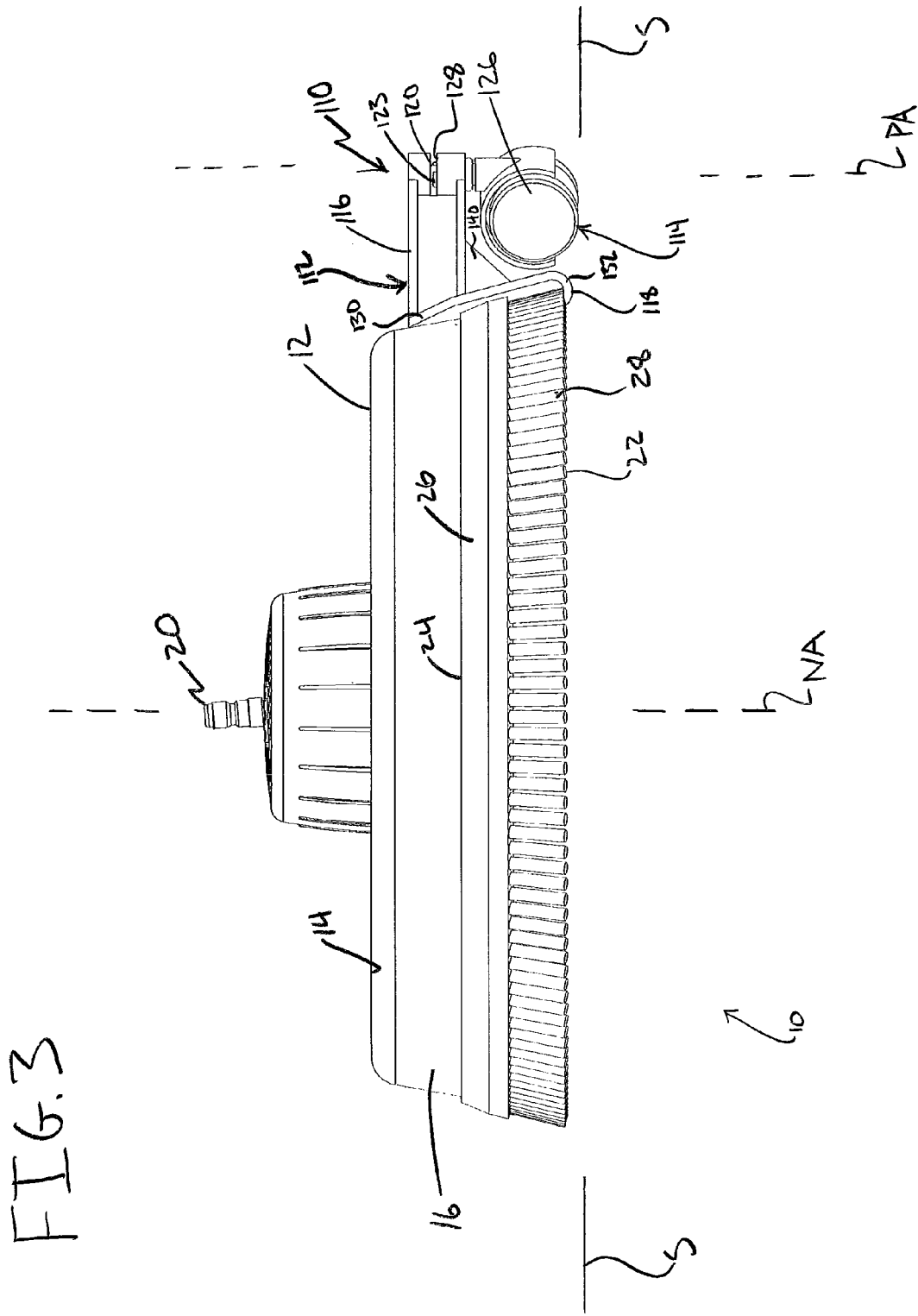
FIG. 3 is a front elevation of the surface cleaner attachment and the roller kit.

Referring to FIGS. 1-3 a surface cleaner attachment for use with a power washer is generally indicated at reference number 10. In FIGS. 1-3, the surface cleaner attachment 10 is shown with an attached roller kit, generally indicated at 110 and described in greater detail below. It will be understood that, in one more embodiments, one or more roller kits 110 can be retrofit onto the surface cleaner attachment 10, and thus the surface cleaner attachment can be a standalone device separate from the roller kit. Accordingly, the roller kit 110 may be sold as a separate unit for attachment to the surface cleaner attachment 10 by a customer or consumer. In other embodiments, the surface cleaner attachment 10 and the roller kit 110 could be assembled together as a single unit at the point of sale.

The surface cleaner attachment 10 includes a shroud 12 having a top end wall 14 and an annular side wall 16 defining a bottom opening 18. As explained below, the surface cleaner attachment 10 is configured to receive high pressure liquid from a power washer (not shown) and to direct one or more high powered jets of the liquid through the bottom opening 18 toward a surface S to be cleaned (FIG. 3). Throughout this disclosure, those skilled in the art will understand the terms "top," "bottom," "upper," "lower," "above," "below," "up," "down," "upward," "downward," etc., are to be used in a relative and not absolute sense. Here, "bottom," "lower," "below," "down," "downward," etc., refer to positions or locations that are relatively closer to the surface S to be cleaned, and "top," "upper," "above," "up," "upward," etc., refer to a positions or locations that are relatively further from surface S to be cleaned. It is understood that the surface cleaning apparatus 10 and the roller kit 110 can be used to clean surfaces S that are non-horizontal and/or inverted. In these applications, one skilled in the art will understand that, while terms such as "top," "bottom," "upper," "lower," "above," "below," "up," "down," "upward," "downward," etc. may be inapt in an absolute or gravitational sense, the relative sense in which the terms are used herein still apply.

Figure 6:
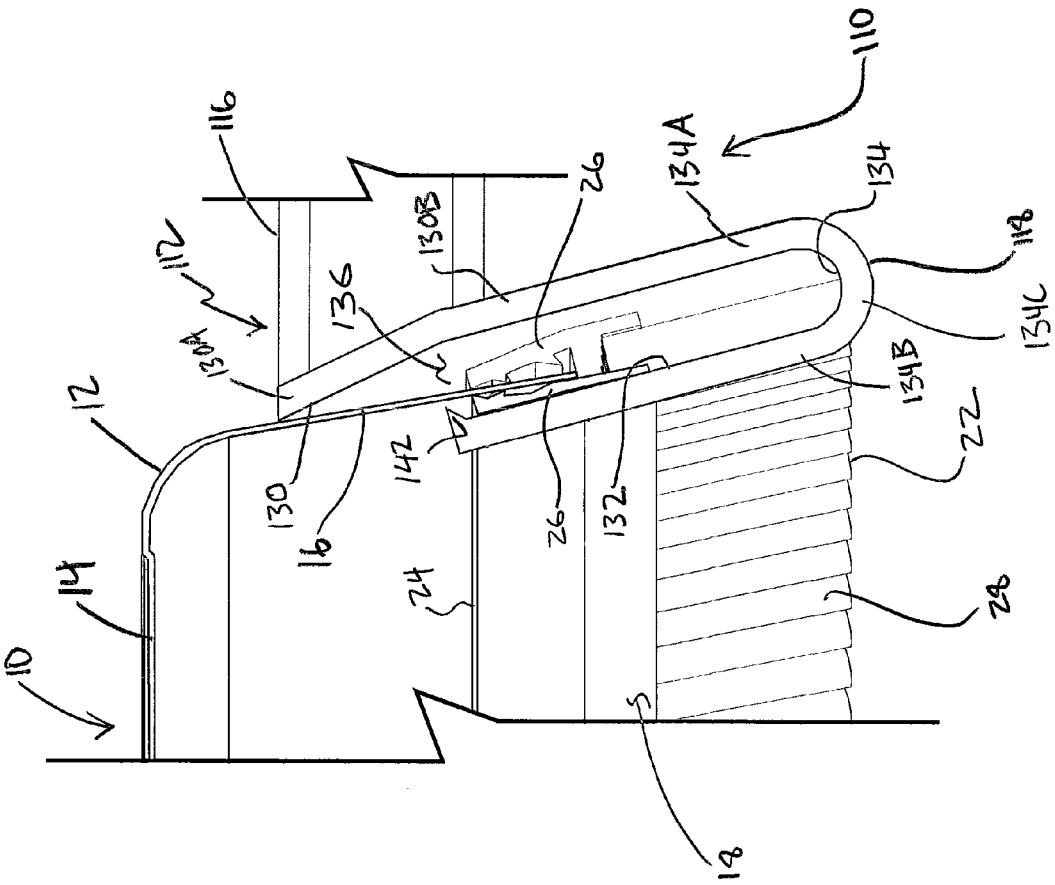
FIG. 6 is a fragmentary cross section taken in the plane of line 6-6 of FIG. 2 illustrating a clip of the roller kit attached to a shroud of the surface cleaner attachment.

Referring to FIGS. 1 and 3, a pressure fitting 20 extends upward from the top end wall 14 of the shroud 12 and is configured to fluidly couple the surface cleaner attachment 10 to the wand or hose of a power washer (not shown). An annular brush 22 is mounted on a bottom end portion of the side wall 16. As shown in FIG. 6, the brush 22 includes a mount 24 that extends circumferentially along the bottom end portion of the side wall 16. The mount 24 includes inner and outer gripping portions 26 that engage inner and outer surfaces of the side wall 16, respectively, to grip the side wall and support the brush 22 on the shroud 12. The gripping portions 26 define lips on the inner and outer surfaces of the side wall 16 that have generally upward facing ends. Bristles 28 extend downward from the mount 24 to brush and/or scrub the surface S during use.

As shown in FIG. 2, a nozzle assembly, generally indicated at 30, is received inside the shroud 12 and includes first and second nozzles 32 oriented to direct fluid through the bottom opening 18. The nozzle assembly 30 is mounted on the shroud 12 for rotation with respect to the shroud about a nozzle axis NA (FIG. 3). The nozzle axis NA is oriented generally perpendicular to the surface S in use. The top end wall 14 of the shroud 12 extends transverse to the nozzle axis NA and the side wall 16 extends circumferentially around the nozzle axis. The side wall 16 is angled or flared to extend radially outwardly of the nozzle axis NA as it extends downward from the top end wall 14 toward its bottom end. The nozzle assembly 30 includes tubing 34 having a top section (not shown) that is fluidly connected to the fitting 20 and first and second arm sections in fluid communication with the top section extending in radially opposite directions with respect to the nozzle axis NA from the bottom end of the top section. Each nozzle 32 is supported on a respective arm section of the tubing 34 and is oriented to direct a jet in a downwardly and circumferentially extending orientation (e.g., downward and clockwise as shown in FIG. 2). When the nozzles 32 direct jets of pressurized liquid toward the surface S, the resulting thrust on the nozzles drives rotation of the nozzle assembly 30 with respect to the shroud 12 about the nozzle axis NA such that the jets trace a circular pattern along the surface. The circular pattern is swept along the path of movement of the surface cleaner attachment 10 during use so that the surface cleaner attachment cleans a width of the surface generally corresponding to the diameter of the circular pattern along the path of movement.

Figure 4:
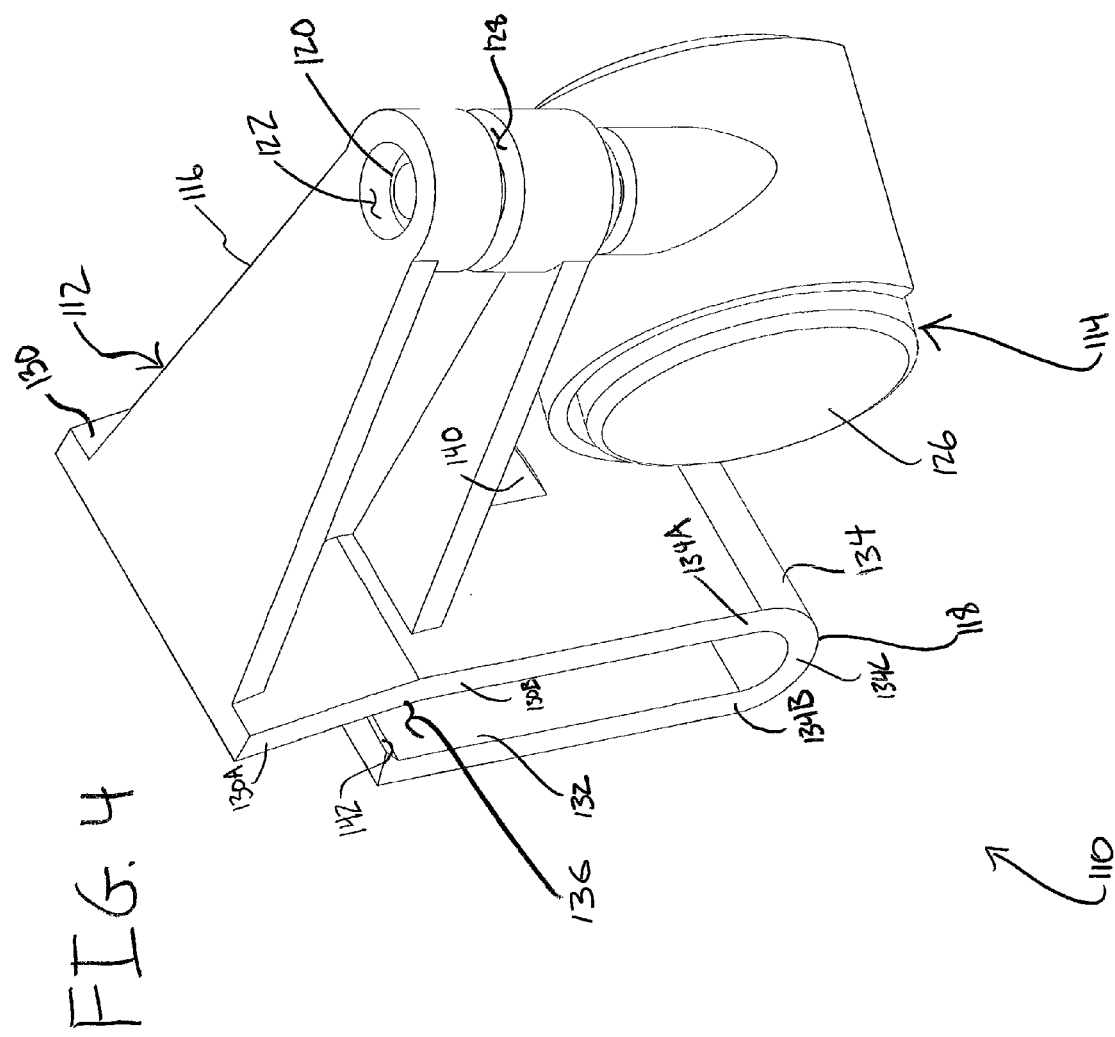
FIG. 4 is a perspective of the roller kit.
Figure 5:
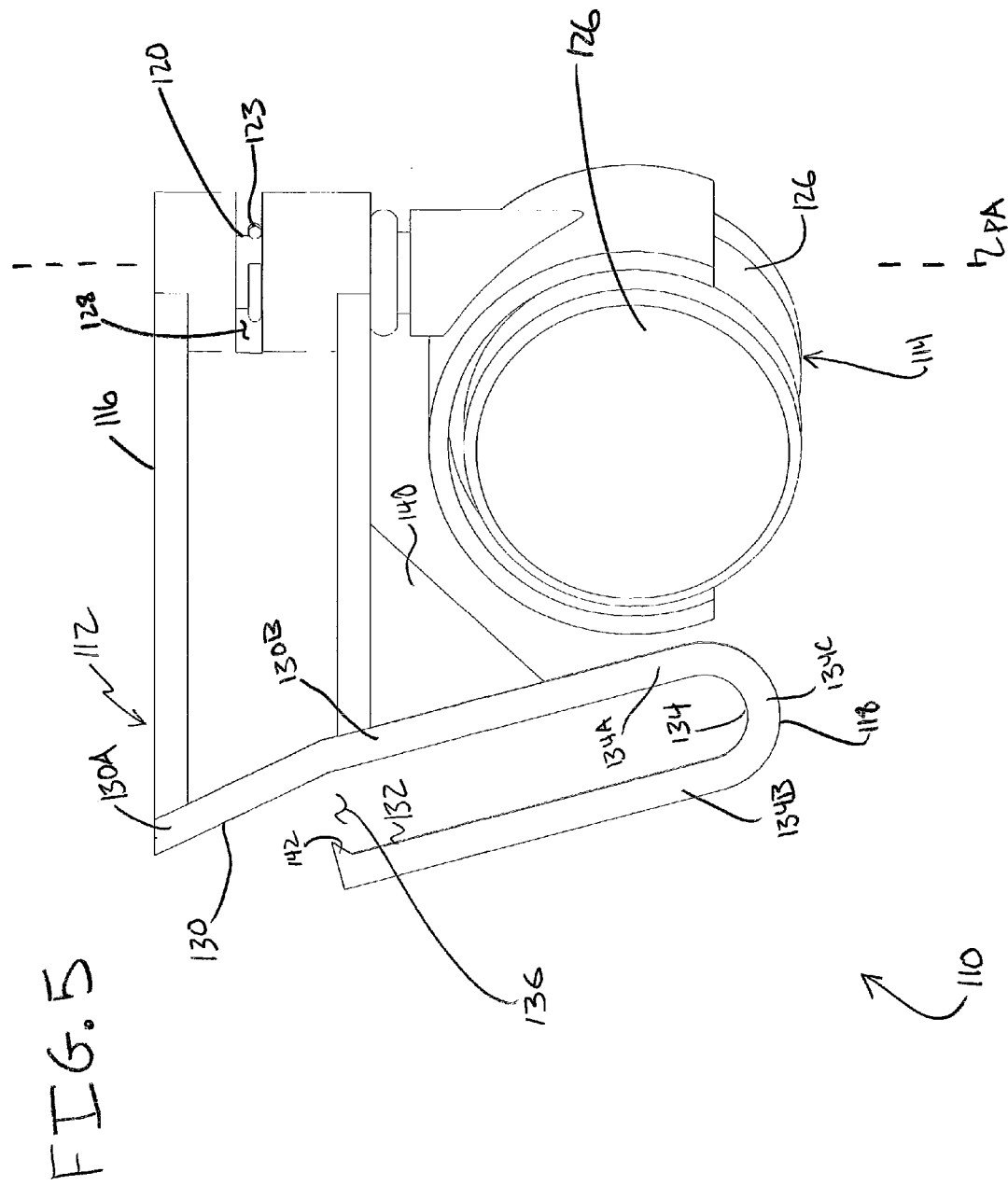
FIG. 5 is a front elevation of the roller kit.

Referring to FIGS. 4 and 5, the roller kit 110 includes a roller mount, generally indicated at 112, and a caster (broadly, a roller), generally indicated at 114, on the roller mount for rolling along the surface S in use. The roller mount 112 includes a bracket 116 for supporting the caster 114, and a clip 118 for securing (e.g., removably securing) the roller kit 110 to the side wall 16 of the shroud 12 of the surface cleaner attachment 10, as described below. In the illustrated embodiment, the clip 118 and the bracket 116 are formed integrally from one piece of material, but they could be separately attached to one another in other embodiments. The caster 114 includes a mounting post 120 that is pivotably received in a socket 122 defined in the bracket 116 and held in place by a split lock ring 123 as described below. The mounting post 120 thus mounts the caster 114 on the roller mount 112 for pivoting about a pivot axis PA (FIG. 5) with the respect to the roller mount. Roller wheels 126 are connected to the mounting post 120 for rotation about a roller axis RA (FIG. 2). The pivot axis PA is oriented generally perpendicular to the roller axis RA in the illustrated embodiment. Moreover in use, the pivot axis PA is oriented generally perpendicular to the surface S and the roller axis RA is oriented generally parallel to the surface S (e.g., the pivot axis is oriented generally vertically and the roller axis is oriented generally horizontally). In use, the roller wheels 126 rotate about the roller axis RA to roll along the surface S and the caster 114 pivots about the pivot axis PA to steer the roller kit 110.

Referring still to FIGS. 4 and 5, the bracket 116 of the roller mount 112 has an inner end portion adjacent the clip 118 and an outer end portion spaced apart from the clip that defines the socket 122. In the illustrated embodiment, the bracket 116 narrows in width as it extends away from the clip 118 toward the outer end portion. The outer end portion of the bracket 116 has a generally cylindrical shape extending along the pivot axis PA. A slot 128 extends transverse to the pivot axis PA through the cylindrical outer end portion of the bracket 116 and is shaped and arranged for receiving the split lock ring 123. Without preventing relative pivoting movement between the caster 114 and the roller mount 112, the lock ring 123 engages the mounting post 120 in the slot 128 and engages the outer end portion of the bracket 116 to limit vertical movement of the caster along the pivot axis PA.

The clip 118 is configured to resiliently grip the side wall 16 of the surface cleaner attachment shroud 12, as shown in FIG. 6. The clip 118 comprises a base portion 130, an arm portion 132, and a connecting portion 134 extending between the base portion and the arm portion. Together, the base portion 130, the arm portion 132, and the connecting portion 134 define a channel-shaped clip. In the illustrated embodiment, the base portion 130, the arm portion 132, and the connecting portion 134 are formed integrally from one piece of material, but the clip can be formed from multiple pieces in other embodiments. In general, the clip 118 is shaped and arranged so that the arm portion 132 opposes the base portion 130 for resiliently gripping the side wall 16 of the shroud 12. As explained below, the clip 118 is configured to bend or deflect resiliently in an opening direction in which the arm portion 132 moves away from the base portion 130 to define an opening 126 between the arm portion and the base portion for receiving the side wall 16 of the shroud 12. In FIGS. 4 and 5, the clip 118 is shown in the open position. Once the clip 118 is released after opening, it rebounds in a gripping direction in which the arm portion 132 moves or is biased toward the base portion 130. In one or more embodiments, the clip rebounds toward a static position in which the arm portion 132 contacts the base portion. As explained in further detail below and shown in FIG. 6, when the side wall 16 of the shroud is received in the opening 126, the clip 116 rebounds to grip the side wall between the arm portion 132 and the base portion 130 to secure the roller mount 112 on the surface cleaner attachment 10. In the illustrated embodiment, the clip 118 is shaped and arranged to secure the roller mount 112 on the shroud 12 of the surface cleaner attachment 10 such that the pivot axis PA is oriented substantially parallel to the nozzle axis NA and transverse to the side wall 16. In addition, the clip 118 is shaped and arranged to secure the roller kit 110 on the shroud 12 such that the roller axis RA is oriented generally perpendicular to the nozzle axis NA and transverse to the side wall 16.

In the illustrated embodiment, the clip 118 is configured to mount the caster 114 on the exterior of the shroud 12. The base portion 130 of the clip 118 is shaped and arranged for engaging the exterior surface of the side wall 16 at a location adjacent the top end wall 14, as shown in FIG. 6. The bracket 116 extends outward from the base portion 130 and is supported by a gusset 140, as shown in FIGS. 4 and 5. The bracket 116, the gusset 140 and the clip 118 together form a fender defining a cavity for receiving portions of the roller wheels 126. The bracket 116 projects outward from the clip 118 a sufficient distance to allow the caster 114 to pivot 360° about the pivot axis PA through the fender-defined cavity without interfering with the clip or the gusset 140.

The base portion 130 of the clip 118 has an upper section 130A defining a top end of the base portion and a lower section 130B. The upper section 130A defines a pointed tip that is spaced apart above the lower section 130B. In the illustrated embodiment, the base portion 130 is configured to engage the side wall 16 of the shroud 12 at the pointed tip. Sections of the interior surface of the clip 118 defined by the base portion 130 slope outward toward the caster 114. The section of the interior surface of the clip 118 defined by the upper end section 130A slopes outward at shallower angle than the section of the interior surface defined by the lower section 130B. The upper section 130A therefore protrudes inward toward the arm portion 132 as it extends away from the lower section 130B to the point of contact with the shroud 12. In this arrangement, the lower section 130B is spaced apart outwardly from the side wall 16 by a sufficient distance to provide space for receiving the brush 22.

The arm portion 132 of the clip 118 is shaped and arranged to engage the interior surface of the side wall 16. In the illustrated embodiment, the arm portion 132 is shaped and arranged to engage the side wall 16 at a location spaced apart below the location of engagement between the base portion 130 and the side wall. More specifically, the arm portion 132 is shaped and arranged to engage the interior gripping portion 26 of the brush mount 24 and/or a portion of the side wall 16 adjacent the top end thereof. Like the base portion 130, the arm portion 132 defines a section of the interior surface of the clip 188 that slopes downward and outward toward the caster 114. In the illustrated embodiment, when the clip 118 is secured to the side wall 16 of the shroud 12, the section of the interior surface defined by the arm portion 132 extends generally parallel to the section of the interior surface defined by the lower segment 130B of the base portion 130. Other clips can have other shapes in other embodiments. The arm portion 132 has an upper segment that defines a hook 142 extending toward the base portion 130. In one embodiment, the arm portion 132 is configured to engage the side wall 16 at the hook 142 when the clip 118 secures the roller kit 110 to the shroud 12. The hook 142 is sized and arranged to extend over the top end of the lip defined by the interior gripping portion 26 of the brush mount 24. Moreover, in certain embodiments, the hook 142 opposingly engages the top end of the lip defined by the interior gripping portion 26 of the brush mount 24. Thus the hook 142 hooks over the lip to inhibit the clip 118 from sliding downward along the side wall 15 in use.

The connecting portion 134 of the clip 118 is resiliently bendable to open and close the clip. The connecting portion 134 is sized and arranged to extend around the bottom edge of the side wall 116. In the illustrated embodiment, the connecting portion 134 is generally U-shaped. The connecting portion 134 has a first leg 134A extending contiguously with the lower segment 130B of the base portion 130, a second leg 134B extending contiguously with the arm portion 132, and a curved segment 134C extending between the first and second legs. To open the clip 118, the arm portion 132 is moved away from the base portion in the opening direction. In response, the connecting portion 134 yields to bend in resilient fashion so that the legs 134A, 134B are pulled apart from one another. When the pulling force is released, the connecting portion 134 rebounds, which causes the arm portion 132 and the base portion 130 to move or be biased toward one another.

In use, the roller kit 110 can be installed on the surface cleaner attachment 10 to operatively align the caster 114 with the surface cleaner attachment for rolling over the surface S to be cleaned to guide movement of the surface cleaner attachment along the surface. If the caster 114 is not installed, the user inserts the mounting post 120 into the bottom end of the socket 120 and inserts the lock ring 123 into the slot 128. The lock ring 123 snaps around the mounting post 120 to secure the caster 114 to the roller mount 112 for pivoting movement about the pivot axis PA. To attach the roller kit 110 to the surface cleaner attachment 112, the user resiliently bends the clip 118 so that the clip defines the opening 126. As explained above, the user can, for example, pull the arm portion 132 away from the base to resiliently bend the clip 118 along the connecting portion 134. In this position, the user aligns the opening 126 with the side wall 16 of the shroud 12 and inserts the side wall between the arm portion 132 and the base portion. The user then releases the clip 118 and the connecting portion 134 rebounds to move the arm portion 132 toward the base portion 130. Alternatively, the clip 118 is slid onto the side wall 16 of the shroud, causing the clip to resiliently deflect. Movement of the clip 118 on the side wall 16 is continued until the hook 142 move past (e.g., above) the gripping portion 26, whereby the clip rebounds slightly and is clipped onto the shroud 12.

As installed the base portion 130 engages the outer surface of the side wall 16 and the arm portion 132 engages the inner surface of the side wall at a location below the point of engagement with the base portion. The arm portion 132 extends from the hook 142 along the interior surface of the side wall 16 and the brush 122, the connecting portion 134 curves around the bottom ends of the side wall and the brush, and the base portion 130 extends along the exterior surfaces of the side wall and the brush until it contacts the outer surface of the side wall at the pointed tip. Thus in use, the clip 118 extends around the brush 122 as well and the bottom edge portion of the side wall 16. The resiliency of the clip 118 causes the clip to grip the side wall between the arm portion 132 and the base portion 130 with gripping force that is alone sufficient to secure the roller kit 110 to the surface cleaner attachment 10 without any other attachment structure (e.g., fasteners, adhesives, etc.). The hook 142 of the arm portion 132 hooks over the lip defined by interior gripping portion 26 of the brush 22 to inhibit the roller mount 112 from sliding downward along the side wall 16.

In some applications, more than one roller kit 110 can be installed on the same surface cleaner attachment. Because the rollers 126 are pivotably mounted on the casters 114, the roller kits automatically pivot into alignment with one another after being installed. Once the desired number of roller kits 110 are secured to the surface cleaner attachment 10, the user can roll the casters 114 along the surface S to guide movement of the device along the surface. The roller kits 110 thus enhance the ease with which the surface cleaner attachment 10 can travel over the surface S being cleaned. The enhancement in maneuverability can be particularly apparent when the roller kits 110 are used in combination with a power washer that lacks adequate power to consistently cause the surface cleaner attachment 10 to hover above the surface S during use. The clip 118 grips the side wall 16 of the shroud 12 with sufficient gripping force to maintain securement between the caster 114 and the shroud while the caster rolls along the surface S. The roller kits 110 can also be removed when not in use. To remove the roller kit, the user again opens the clip 118 to enlarge the opening 126 and withdraws the side wall 16 of the surface cleaner attachment 10 from the clip. The roller kits 110 can be repeatedly installed and removed from the surface cleaner attachment as required by the user.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above products without departing from the scope of the invention, it is intended that all matter contained in the above description and shown in the accompanying drawings shall be interpreted as illustrative and not in a limiting sense.

What is claimed is:

1. A roller kit for a power washer surface cleaner attachment, the roller kit comprising:

a roller configured for rotation about a roller axis; and
a roller mount including a bracket mounting the roller for rotation about the roller axis with respect to the roller mount and a clip for securing the roller kit to the surface cleaner attachment such that the roller is operatively aligned with the surface cleaner attachment for rolling over a surface to guide movement of the surface cleaner attachment along said surface, the clip including a base portion supporting the bracket and an arm portion opposing the base portion, the clip being configured to bend resiliently in an opening direction to define an opening between the arm portion and the base portion for receiving a side wall of a shroud of the surface cleaner attachment and to rebound in a gripping direction to grip the side wall between the arm portion and the base portion and thereby secure the roller kit to the surface cleaner attachment, wherein the clip is configured to impart a resilient gripping force upon the side wall of the shroud that is alone sufficient to secure the roller kit to the surface cleaner attachment.

2. A roller kit as set forth in claim 1, wherein the clip further comprises a resilient connecting portion connecting the arm portion to the base portion.

3. A roller kit as set forth in claim 2, wherein the connecting portion is configured to extend around a bottom edge of the side wall.

4. A roller kit as set forth in claim 2, wherein the connecting portion is generally U-shaped.

5. A roller kit as set forth in claim 4, wherein the connecting portion includes a first leg extending from the base portion, a second leg extending from the arm portion, and a curved portion extending between the first leg and the second leg.

6. A roller kit as set forth in claim 2, wherein the connecting portion is formed integrally with the base portion and the arm portion from one piece of material.

7. A roller kit as set forth in claim 1, wherein when the clip is shaped and arranged so that the arm portion is configured to engage the side wall at a first location and the base portion is configured to engage the side wall at a second location above the first location along a height of the side wall when the clip grips the side wall.

8. A roller kit as set forth in claim 1, wherein the base portion of the clip includes a lower section and an upper section, the upper section defining a pointed a tip spaced apart from the lower section, the base portion of the clip being configured to engage the side wall of the shroud at the tip when the clip grips the side wall.

9. A roller kit as set forth in claim 8, wherein the base portion has an interior surface that slopes outwardly and downward, the interior surface sloping at a shallower angle along the upper section than the lower section.

10. A roller kit as set forth in claim 1, wherein the arm portion has a free end segment including a hook extending toward the base portion.

11. A roller kit as set forth in claim 10, wherein the arm portion is configured to engage the side wall of the shroud at the hook when the clip grips the side wall.

12. A roller kit as set forth in claim 10, wherein the hook is configured to hook over an end of a lip protruding from the side wall of the shroud when the clip grips the side wall.

13. A roller kit as set forth in claim 1, wherein the bracket is formed integrally with the clip from one piece of material.

14. A roller kit as set forth in claim 1, wherein the roller comprises a caster pivotably mounted on the roller mount for pivoting with respect to the roller mount about a pivot axis oriented generally perpendicular to the roller axis.

15. A roller kit as set forth in claim 1, wherein the roller mount includes a fender defining a cavity for receiving a portion of the roller.

16. A method of using a roller kit for a surface cleaner attachment for a power sprayer, the method comprising:
    bending a clip of a roller mount of the roller kit that supports a roller for rotation about a roller axis so that the clip defines an opening;
    inserting a side wall of a shroud of the surface cleaner attachment into the opening; and
    releasing the clip after inserting the side wall into the opening so that the clip rebounds to grip the side wall and thereby releasably secures the roller kit to the shroud, wherein the step of releasing the clip causes the clip to grip the side wall with a resilient gripping force that is alone sufficient to maintain said securement between the roller and the shroud.

17. A method as set forth in claim 16, rolling the roller along a surface after securing the roller kit on the shroud to guide movement of the surface cleaner attachment over the surface.

18. A method as set forth in claim 16, further comprising bending the clip to define the opening after securing the roller kit to the shroud and withdrawing the side wall of the shroud from the opening to remove the roller kit from the shroud.

* * * * *